US009594655B2

(12) United States Patent
Reghunath et al.

(10) Patent No.: US 9,594,655 B2
(45) Date of Patent: Mar. 14, 2017

(54) CACHE DEBUG SYSTEM FOR PROGRAMMABLE CIRCUITS

(71) Applicant: Altera Corporation, San Jose, CA (US)

(72) Inventors: Manoj Reghunath, Austin, TX (US); Sam Hedinger, Austin, TX (US)

(73) Assignee: Altera Corporation, San Jose, CA (US)

( * ) Notice: Subject to any disclaimer, the term of this patent is extended or adjusted under 35 U.S.C. 154(b) by 484 days.

(21) Appl. No.: 13/951,104

(22) Filed: Jul. 25, 2013

(65) Prior Publication Data

US 2015/0033075 A1    Jan. 29, 2015

(51) Int. Cl.
*G06F 11/27*    (2006.01)
*G06F 11/36*    (2006.01)

(52) U.S. Cl.
CPC ............ *G06F 11/27* (2013.01); *G06F 11/364* (2013.01); *G06F 11/3656* (2013.01)

(58) Field of Classification Search
CPC ............... G06F 17/5054; G06F 17/505; G06F 17/5045; G06F 11/27; G06F 11/3648
See application file for complete search history.

(56) References Cited

U.S. PATENT DOCUMENTS

| 7,627,784 | B1 | 12/2009 | Allen et al. |
| 8,069,290 | B2 | 11/2011 | Conti et al. |
| 8,336,009 | B2 | 12/2012 | Mehta |
| 8,341,604 | B2 | 12/2012 | Codrescu et al. |
| 8,370,806 | B2 | 2/2013 | Codrescu |
| 8,467,218 | B1 | 6/2013 | Atsatt et al. |
| 8,874,801 | B1* | 10/2014 | Ramineni ............... G06F 13/20 710/15 |
| 2008/0098162 | A1* | 4/2008 | Yang ..................... G06F 13/385 711/103 |
| 2008/0288725 | A1 | 11/2008 | Moyer et al. |
| 2012/0173825 | A1 | 7/2012 | Ehrlich et al. |
| 2014/0281775 | A1* | 9/2014 | Shanker ........... G01R 31/31705 714/727 |

FOREIGN PATENT DOCUMENTS

GB    2380826    4/2003

* cited by examiner

*Primary Examiner* — Jigar Patel
(74) *Attorney, Agent, or Firm* — Treyz Law Group, P.C.; G. Victor Treyz; Andrew C. Milhollin

(57) ABSTRACT

An integrated circuit may be provided with system-on-chip circuitry including system-on-chip interconnects and a microprocessor unit subsystem. The subsystem may include microprocessor cores that execute instructions stored in memory. Cache may be used to cache data for the microprocessor cores. A memory coherency control unit may be used to maintain memory coherency during operation of the microprocessor unit subsystem. The memory coherency control unit may be coupled to the system-on-chip interconnects by a bus. A command translator may be interposed in the bus. The command translator may have a slave interface that communicates with the interconnects and a master interface that communicates with the memory coherency control unit. The integrated circuit may have programmable circuitry that is programmed to implement a debug master coupled to the interconnects. During debug operations, the command translator may translate commands from the debug master.

17 Claims, 4 Drawing Sheets

CACHE DEBUG SYSTEM FOR PROGRAMMABLE CIRCUITS

BACKGROUND

This invention relates to debugging the operation of integrated circuits such as programmable integrated circuits with hardwired circuitry such as system-on-chip circuitry.

Programmable integrated circuits such as field programmable gate arrays (FPGAs) contain logic circuitry that can be programmed by a user to perform custom functions. System-on-chip (SOC) integrated circuits include microprocessor circuitry, memory, interconnect buses, and peripherals. Some integrated circuits include a first portion that is based on programmable logic circuitry of the type found in many field programmable gate array circuits and a second portion that is based on hardwired system-on-chip circuitry. These integrated circuits, which are sometimes referred to as system-on-chip field-programmable gate arrays (SOC FPGAs), exhibit flexibility due to the presence of programmable circuitry and substantial processing power due to the presence of hardwired system-on-chip circuitry.

Debugging schemes for some system-on-chip integrated circuits are invasive and require halting of the processing circuitry. Existing non-invasive debugging schemes do not require that the processing circuitry be halted during debugging, but only allow access to limited performance monitoring information and instruction tracing.

It would therefore be desirable to be able to perform improved debugging operations on integrated circuits with processors and memory.

SUMMARY

An integrated circuit may be provided with system-on-chip circuitry including system-on-chip interconnects and a microprocessor unit subsystem. The microprocessor unit subsystem may also include level one cache, level two cache, a memory management unit, a memory coherency control unit, and microprocessor cores that execute instructions stored in memory.

The cache may be used to cache data for the microprocessor cores. The memory coherency control unit may be used to maintain memory coherency during operation of the microprocessor unit subsystem.

The memory coherency control unit may be coupled to the system-on-chip interconnects by a bus. A command translator may be interposed in the bus. The command translator may have a slave interface that communicates with the interconnects and a master interface that communicates with a slave in the memory coherency control unit.

The integrated circuit may be a system-on-chip field-programmable gate array or other integrated circuit that includes programmable circuitry. The programmable circuitry may include programmable interconnects that interconnect regions of programmable logic. The programmable circuitry may be programmed by loading configuration data into memory elements in the programmable logic regions from external equipment such as a programmer or a configuration integrated circuit.

The programmable circuitry may be programmed to implement a debug master. The debug master may be coupled to an external debug tool using a bus. A user may use the debug tool to provide the debug master with instructions for performing desired debug operations. In response to the instructions, the debug master may issue commands. The commands may be provided to the slave interface in the command translator over the system-on-chip interconnects. The command translator may translate the commands received on the slave interface and may provide the memory coherency control unit with corresponding translated commands using the master interface in the command translator.

Further features of the invention, its nature and various advantages will be more apparent from the accompanying drawings and the following detailed description of the preferred embodiments.

DETAILED DESCRIPTION

Figure 1:
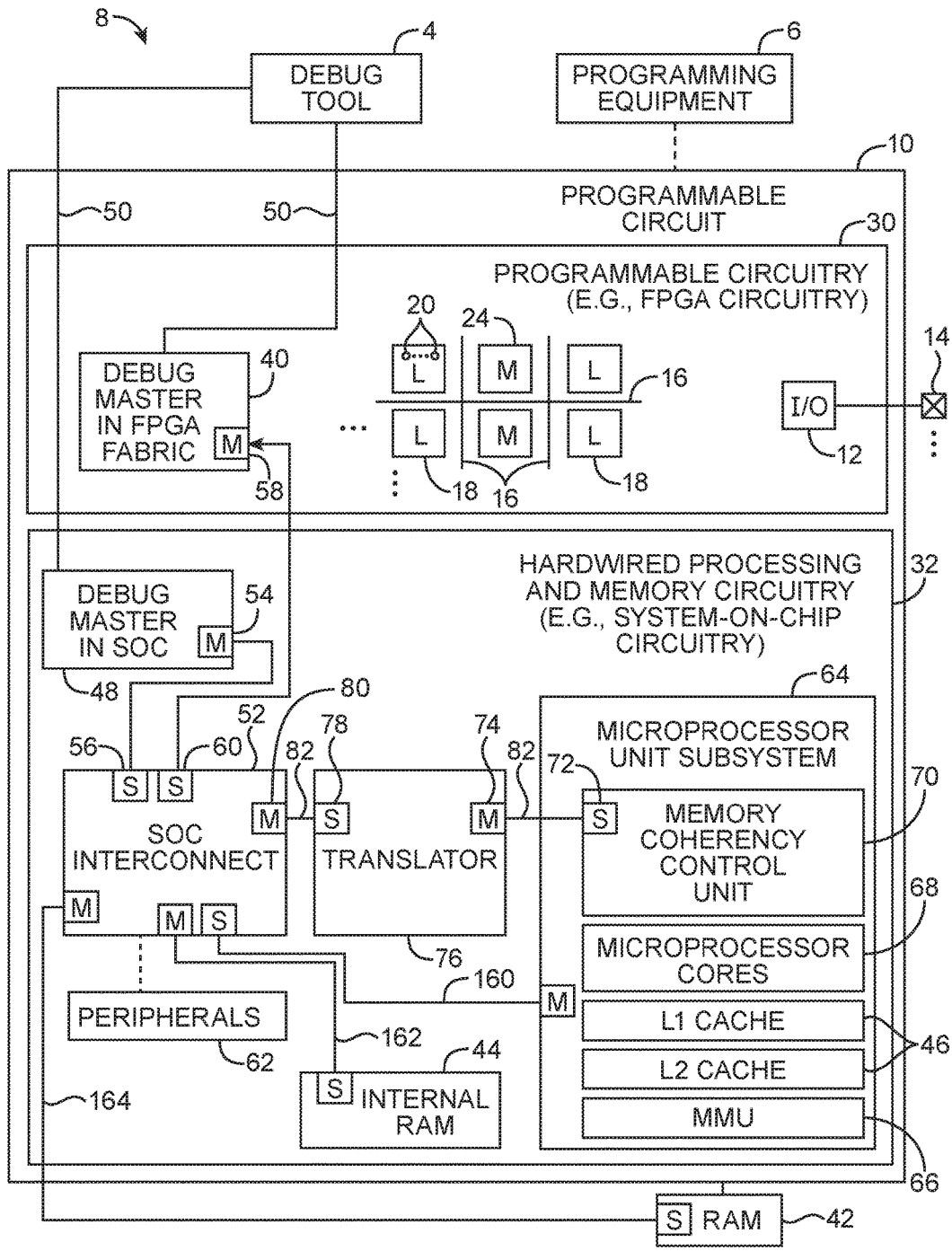
FIG. 1 is a diagram of an illustrative debugging system based on an integrated circuit such as a programmable integrated circuit with hardwired system-on-chip circuitry that may be provided with programmed and hardwired debug masters and other resources for supporting debug operations in accordance with an embodiment of the present invention.

An illustrative system of the type that may be used in performing debug operations is shown as system 10 in FIG. 1. As shown in FIG. 1, an integrated circuit under test such as integrated circuit 10 may be coupled to external equipment such as debug tool 4 and programming equipment 6. Programming equipment 6 may be used to program integrated circuit 10 to perform a desired custom logic function. Debug tool 4 may be used to perform tests on integrated circuit 10.

Integrated circuit 10 may be, as an example, a programmable integrated circuit with programmable logic of the type that is sometimes referred to as a system-on-chip field-programmable gate array (SOC FPGA) or other programmable device with programmable circuitry 30. Programmable circuitry 30 may include input/output circuitry 12 for driving signals off of device 10 and for receiving signals from other devices via input/output pins 14. Interconnection resources 16 such as global and local vertical and horizontal conductive lines and buses may be used to route signals on device 10. Interconnection resources 16 may include conductive lines and programmable connections between respective conductive lines and may therefore sometimes be referred to as programmable interconnects 16.

Programmable circuitry 30 may include blocks of programmable logic such as programmable logic 18. Programmable logic regions 18 may include combinational and sequential logic circuitry and may be configured to perform a custom logic function. Programmable interconnects 16 may contain programmable circuitry and may therefore be considered to be a type of programmable logic.

Each block of programmable logic 18 in integrated circuit 10 may contain programmable memory elements 20. Memory elements 20 can be loaded with configuration data (also called programming data) using pins 14 and input/ output circuitry 12. Configuration data can be loaded from an external source such as a configuration integrated circuit (i.e., a configuration integrated circuit that has been itself loaded with configuration data from a programmer) or from other external programming equipment (e.g., a programming tool based on programming software running on a computer or other computing equipment). External programming equipment for providing device 10 with configuration data is shown in FIG. 1 as programming equipment 6.

Once loaded with configuration data, the memory elements in programmable circuitry 30 of integrated circuit 10 each provide a corresponding static control output signal that controls the state of an associated logic component in programmable logic 18. Memory elements 20 may use any suitable volatile and/or non-volatile memory structures such as random-access-memory (RAM) cells, fuses, antifuses, programmable read-only-memory memory cells, mask-programmed and laser-programmed structures, etc. Because memory elements 20 are loaded with configuration data during programming, memory elements 20 are sometimes referred to as configuration memory or configuration RAM.

If desired, programmable circuitry 30 may be provided with internal memory such as memory blocks 24 for storing data that is generated and consumed by the custom circuits implemented in programmable logic 18. Dedicated circuits (sometimes referred to as hardwired circuits) may also be included in programmable circuitry 30. For example, digital signal processing circuits may be incorporated into programmable circuitry 30.

In addition to using the resources of programmable circuitry 30 to implement desired custom logic circuits for a user, programmable circuitry 30 may be programmed using configuration data from programming equipment 6 to implement test-related circuitry such as debug master 40.

Integrated circuit 10 may contain hardwired circuitry 32. Memory interface circuitry may be used to provide an interface between integrated circuit 10 and external memory 42 (e.g., random-access memory). Circuitry 32 may also include internal random-access memory 44. Cache memory 46 such as level one (L1) and level two (L2) cache memory may be used to cache data for memory 44 and/or 42.

Integrated circuit 10 may be a system-on-chip field programmable gate array in which programmable circuitry 30 serves as a field-programmable gate array block and in which circuitry 32 serves as a system-on-chip block. The presence of programmable circuitry 30 allows integrated circuit 10 to be customized to produce a wide variety of different logic designs. The presence of system-on-chip circuitry 32 allows hardwired circuitry to be employed to handle tasks that are well suited to hardwired circuits such as video processing, microprocessor applications, communications (e.g., using a Universal Asynchronous Receiver Transmitter (UART)), disk drive control functions, etc.

Hardwired circuitry 32 may include hardwired circuitry for supporting debugging operations such as debug master 48. Hardwired debug master 48 and/or debug master 40 (which is implemented in the programmable logic fabric of programmable circuitry 30) may communicate with debug tool 4 over paths such as paths 50. Paths 50 may be Joint Test Action Group (JTAG) paths or other suitable communications paths.

Hardwired circuitry 32 may include interconnects such as interconnects 52 (sometimes referred to as system-on-chip interconnects). Debug master 48 may have a master bus interface such as master interface 54 with which debug master 48 communicates with associated slave interface 56 in interconnects 52. Master interface 58 of debug master 40 may likewise communicate with slave interface 60 in interconnects 52.

Microprocessor unit subsystem 64 may be used to handle processing tasks for hardwired circuitry 32. Subsystem 64 may include memory coherency control unit 70, one or more microprocessor cores 68 or other microprocessor circuitry, cache 46, and memory management unit 66. Memory coherency control unit 70 may be used to maintain coherency during memory access operations to the cache and memory.

Peripherals 62 may be coupled to resources in integrated circuit 10 via interconnects 52 using slave and master circuits. Peripherals 62 may include communications blocks (e.g., UART circuitry), a graphics processing unit, a video accelerator, a modem, display controllers, a hard drive controller, and other support circuits for integrated circuit 10. The functions performed by peripherals 62 and microprocessor cores 68 are generally more efficiently performed using hardwired circuitry than programmable circuitry 30, but such functions may, if desired, be partly or fully implemented using programmable circuitry 30.

Bus 82 may be coupled between subsystem 64 and interconnects 52. Command translator 76 may be interposed in bus 82. Command translator 76 preserves memory coherency while serving as an interface between interconnects 52 and microprocessor unit subsystem 64.

Interconnects 52 may have interfaces for supporting communications with resources such as subsystem 64 (via path 160), internal memory 44 (via path 162), and external memory 42 (via path 164). Debug master 40 therefore has two paths to access internal memory contents (the second of which involves coherent access): 1) directly via interconnect 52 and path 162; 2a) via interconnect 52, translator 76, memory coherency control unit 70, interconnect 52, internal memory 44 or 2b) interconnect 52, translator 76, memory coherency control unit 70, and L1/L2 cache 46 when the internal memory content might have been cached.

It can be challenging to test complex circuits such as integrated circuit 10. With an arrangement of the type shown in FIG. 1, equipment such as debug tool 4 may be used to help test integrated circuit 10 while integrated circuit 10 is being used in system 8. During operation, microprocessor cores 68 may execute instructions stored in memory (e.g., memory 44, 42, and/or 46) and programmable circuitry 30 may perform custom logic functions. Debugging operations performed with debug tool 4 can be used to assist in identifying performance issues, such as problems with code running on microprocessor circuitry 68 and/or the operation of other circuitry in integrated circuit 10.

Debug tool 4 may provide a user interface with which a user can control testing (debugging) operations for integrated circuit 10. Debug tool 4 may be implemented using dedicated test hardware, testing software running on one or more computers, or other testing software running on computing equipment. Networked and stand-along computer systems may be used in implementing debug tool 4. Keyboards, touch controllers, displays, and other input-output equipment in debug tool 4 may be used in gathering input from a user and in providing output to a user.

Debug tool 4 preferably allows users to define debug operations to be performed during debugging of integrated circuit 10. Examples of debug operations that may be performed using debug tool 4 include reading data from desired memory locations, writing data to desired memory locations, reading and writing data associated with particular cache locations, observing system operations, etc. During setup operations, debug tool 4 may be provided with information (e.g., database information and/or manually input information from a user) on the capabilities of a particular integrated circuit to be debugged (e.g., information on the system-on-chip layout of circuitry 32, information on the resources of circuitry 30, etc.).

Using this information, debug tool 4 may interact with one or more debug masters in integrated circuit 10 such as debug masters 40 and 48. Each debug master interfaces with the debug tool and provides a bus master interface (see, e.g., masters 54 and 58) that is coupled to system-on-chip interconnects 52. During testing, the debug master serves as an intermediary that allows debug tool 4 to communicate with resources coupled to system-on-chip interconnects 52 such as peripherals 62 and microprocessor unit subsystem 64.

If desired, the debug master may be configured to include desired memory addresses and other information associated with a debug operation. By configuring this information into the debug master (e.g., by implementing debug master 40 in programmable circuitry 30 using programming equipment 6 or other programming techniques), test speed can be increased.

An advantage of implementing the debug master in programmable circuitry 30 is that tests are possible where, as an example, the debug master is programmed with 150 predefined read locations each of which is to be read one hundred times to observe how an application running on cores 68 performs. Hardwired debug masters such as debug master 48, on the other hand, are somewhat generic in their capabilities, so a comparable test procedure implemented on debug master 48 would require reloading each of the 150 different read locations one at a time as tests are performed.

In general, either debug master 40 or debug master 48 may be used in performing debugging operations with debug tool 4. Arrangements in which debug tool 4 uses debug master 40 to perform testing are sometimes described herein as an illustrative example.

Interconnects 52 may include bus resources that serve as the main bus for circuitry 32 (sometimes referred to as the SOC interconnect bus). Interconnects 52 may also include bus masters and bus slaves. Circuitry 32 may include coherency port bus 82 to provide access to memory coherency control unit. Bus 82 may be coupled between subsystem 64 (memory coherency control unit 70) and interconnects 52. System-on-chip command translator 76 may be interposed in bus 82. System-on-chip command translator 76 may have system-on-chip command translator slave 78 for communicating with master 80 over bus 82 and system-on-chip command translator master 74 for communications with memory coherency control unit slave 72 over bus 82. If desired, the segment of bus 82 between master 74 and slave 72 may represent a subset of the segment of bus 82 between slave 78 and master 80. Master 80 may communicate with system-on-chip interconnect slaves such as slaves 56 and 60.

Figure 2:
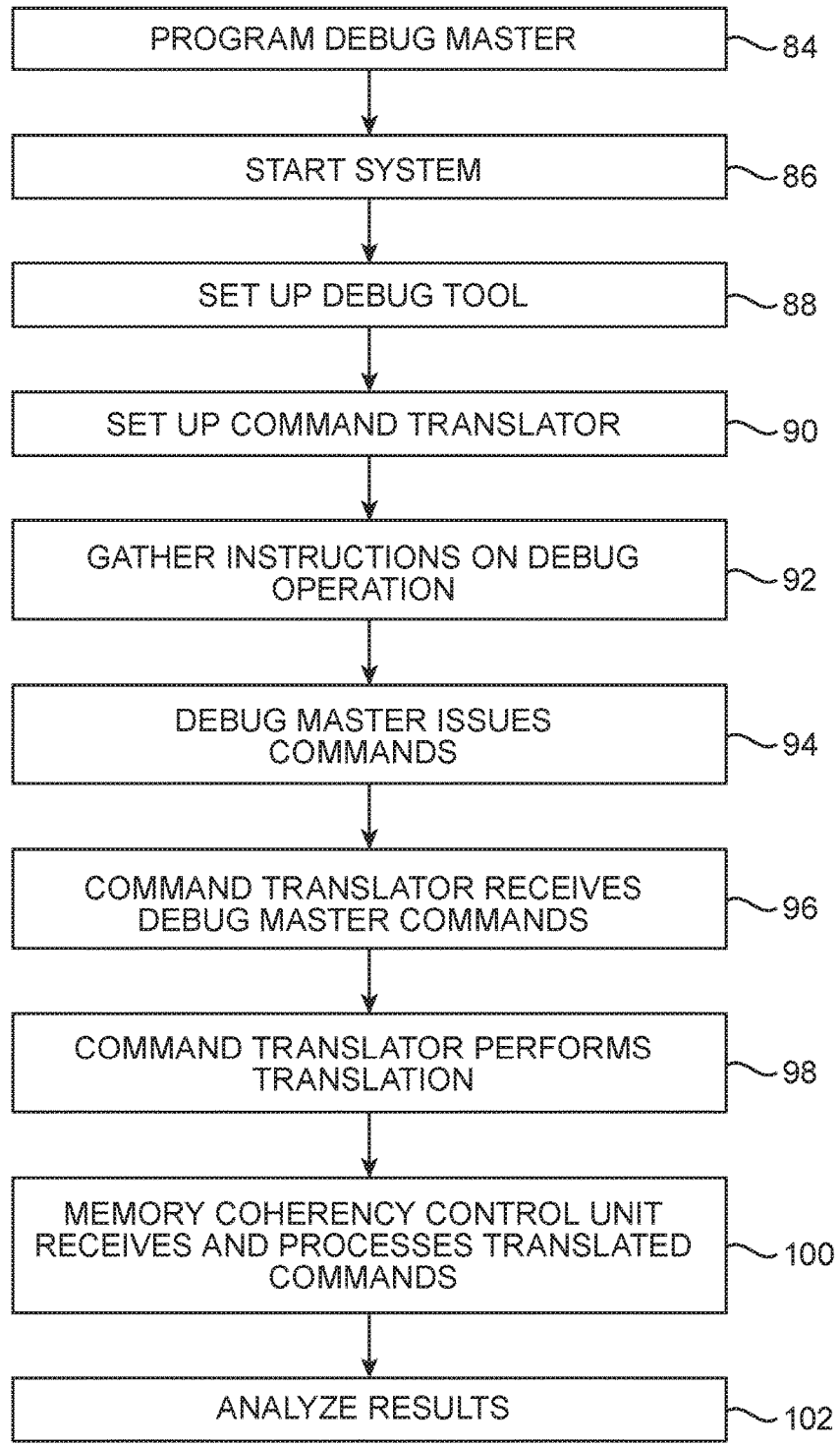
FIG. 2 is a flow chart of illustrative steps involved in using the system of FIG. 1 to perform debug operations in accordance with an embodiment of the present invention.

Illustrative debug operations of the type that may be performed with system 8 are shown in FIG. 2.

At step 84, programming equipment 6 (e.g., an external configuration integrated circuit and/or a computer-based programming tool) may be used in loading configuration data into programmable circuitry 30. The configuration data preferably includes configuration data that programs programmable circuitry 30 to implement debug master 40 in programmable circuitry 30 (e.g., in part of programmable circuitry 30) for performing desired debug operations. Other portions of programmable circuitry 30 may be used for forming user logic. By forming a custom debug master, debug operations can be performed more efficiently than using a hardwired debug master (e.g., by avoiding repetitions reloading operations of the type described in connection with debug master 48). Circuitry 30 may also be tested in conjunction with the operation of circuitry 32.

At step 86, the user (i.e., test personnel operating debug tool 4) may commence system operation. During operation, the processing resources of integrated circuit 10 (e.g., cores 68) may execute instructions stored in the storage circuits of integrated circuit 10 (e.g., memory and cache in circuitry 32). Memory coherency control unit 70 may be used to maintain memory coherency. The software that is running (i.e., the application running on cores 68) sets up memory management unit 66. For example, memory management unit setup determines whether or not a particular memory address range is cacheable or not, write back behavior, write through behavior, ordering behavior (strongly ordered or not strongly ordered), memory type behavior (device memory or normal memory), etc.

At step 88, the user may set up debug tool 4. In particular, the user may use a keyboard or other equipment to inform debug tool 4 of the address space being used by system-on-chip circuitry 32. The user also preferably informs debug tool 4 of the capabilities of the debug master (e.g., debug parameters to use when communicating, the JTAG identifier (ID) of debug master 40, etc.) and informs debug tool 4 on details concerning address translations to be performed on read and write requests that are to be made during testing.

Before testing begins, the user may analyze the nature of the application that is loaded on integrated circuit 10 (e.g., the application to run on cores 68) to determine what type of debug operation to perform. For example, the user may be interested in examining the contents of memory at a particular memory location during operation of application to reveal information on whether or not the application is operating satisfactorily. The user may analyze the application's structure and the memory management unit (MMU) setup associated with the application to identify a memory address of interest for debugging. As another example, the user may be interested in observing how the application performs when particular data is written into cache to force an unexpected behavior onto the application (forced invalidation of cache entries, pre-fetching of cache entries). After determining what type of testing is to be performed, the user may proceed with setting up test system 8.

At step 90, the user may set up system-on-chip command translator 76. The user may use debug tool 4 (e.g., a command line on a visual user interface presented to the user by the debug tool) to perform setup operations. Debug tool 4 may use debug master 40 and interconnects 52 in communicating with translator 76 in response to the user's command line entries or other instructions. During setup operations at step 90, translator 76 is provided with information about translation of master system-on-chip interconnect bus identifiers, translation of memory addresses, and translation of cache attributes. The user can set up parameters in translator 76 such as masterID, AxUSER and AxCACHE parameters in an illustrative scenario. These system-on-chip command translator parameters set up the translation that command translator 76 is to performs between command translator slave interface 78 and command translator master interface 74.

At step 92, the user instructs debug tool 4 of the debug operations to be performed and these instructions are gathered from the user by debug tool 4. Examples of debug operations that may be performed using system 8 include coherent memory debug, backdoor access to L2 cache, performance analysis of L2 cache, monitoring of application cache activity, monitoring of processor activity, forcing specific behaviors on application running on processor, etc.

At step 94, debug tool 4 instructs debug master 40 to issues commands to implement the desired debug operations. The issued commands may be, for example, memory access commands (read commands and/or write commands). In response, debug master 40 uses master interface 58 to provide commands to slave 60 in interconnects 52.

At step 96, master interface 80 receives the commands from slave 60 and provides the commands to slave interface 78 of translator 76. Slave interface 78 receives the commands for translator 76. The commands received by translator 76 at step 96 may be memory access commands such as read commands and/or write commands.

At step 98, command translator 76 may perform translation operations in accordance with the command translator setup parameters established during the setup operations of step 90. Examples of translation operations that may be performed include translation of master system-on-chip interconnect bus identifiers, translation of memory addresses, and translation of cache attributes. The translation operations are performed between slave interface 78 (i.e., the interface receiving the commands from master interface 58 in debug master 40 via interconnects 52 and interfaces 60 and 80 in this example) and master interface 74. The translated commands (e.g., memory access commands on which command translator 76 has performed address translations) may be used to debug circuitry 10. For example, specific cacheability, writeback, and writethrough behaviors can be forced onto L1 and/or L2 caches.

At step 100, memory coherency control unit 70 may receive the translated commands from translator 76 (i.e., slave interface 72 may receive the translated commands via master interface 74 over bus 82).

At step 102, as integrated circuit 10 responds to the translated commands, the user may observe the impact of the translated commands on system performance (e.g., by gathering data, observing output signals, etc.) and can analyze these test results.

The debug techniques of FIG. 2 may be used to perform coherent debug operations without affecting application and processor execution.

Figure 3:
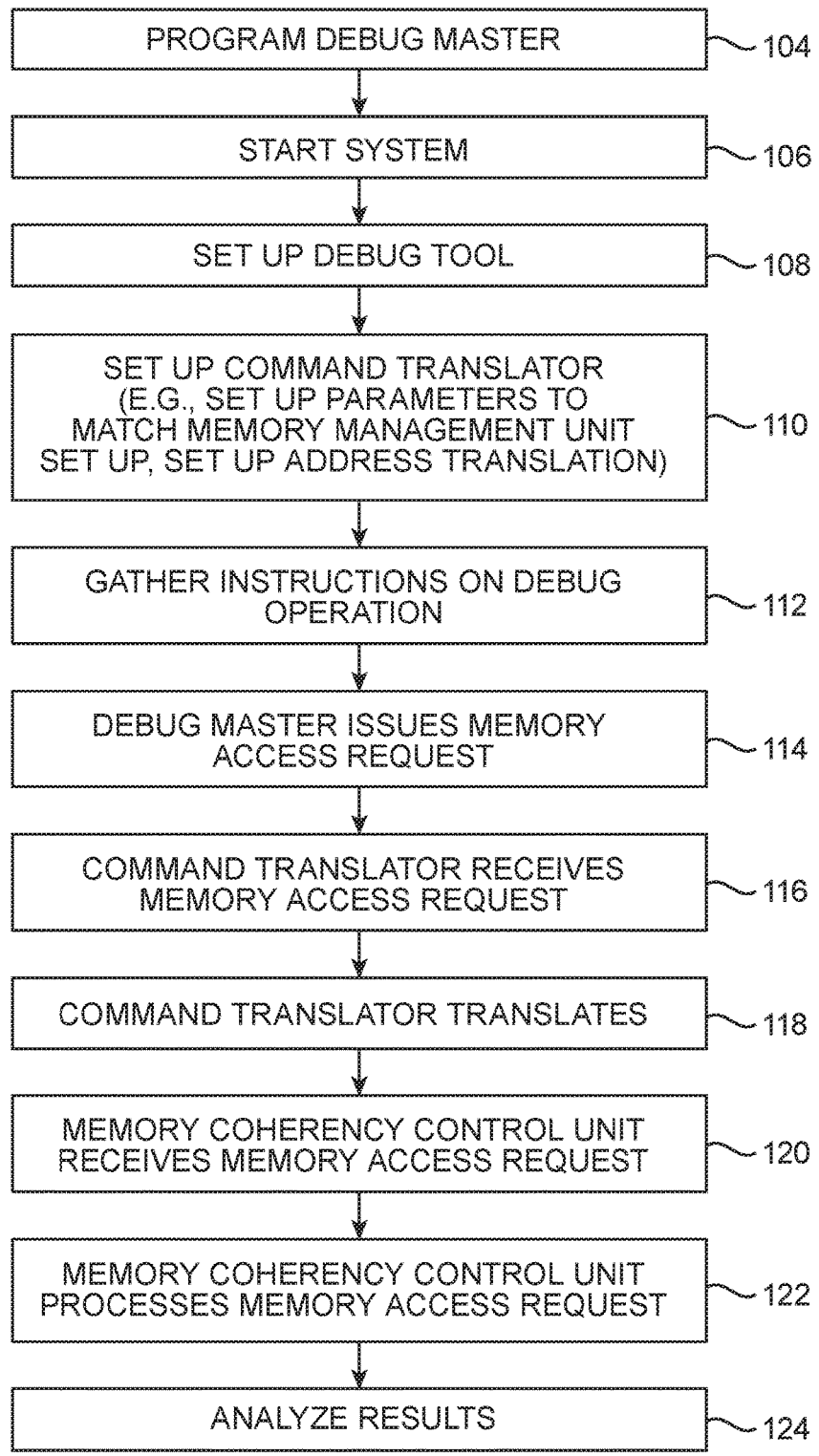
FIG. 3 is a flow chart of illustrative steps involved in using the system of FIG. 1 to perform coherent debug operations in accordance with an embodiment of the present invention.

FIG. 3 is a flow chart of illustrative steps involved in performing coherent debug operations (i.e., debug operations that preserve memory coherency). In the example of FIG. 3, data is being stored at random-access memory (RAM) address range 0x8000_0000-0x8000_FFFF and microprocessor cores 68 are working on this data (performing reads, writes, and modifications).

At step 104, programming equipment 6 (e.g., an external configuration integrated circuit and/or a computer-based programming tool) may be used in loading configuration data into programmable circuitry 30. As described in connection with FIG. 2, the configuration data preferably includes configuration data that programs programmable circuitry 30 to implement debug master 40 and master interface 58 for performing desired debug operations.

At step 106, the user may initiate system operation, starting system 8 so that the processing resources of integrated circuit 10 (e.g., cores 68) may execute instructions stored in the storage circuits of integrated circuit 10 (e.g., memory and cache in circuitry 32). During system operation, memory coherency control unit 70 may be used to maintain memory coherency.

The application running on cores 68 sets up memory management unit 66. For example, memory management unit setup for memory management unit 66 determines whether or not a particular memory address range is cacheable or not, write back behavior, write through behavior, ordering behavior (strongly ordered or not strongly ordered), memory type behavior (device memory or normal memory), etc. In the present example, memory management unit setup operations determine whether or not RAM address range 0x8000_0000-0x8000_FFFF is cacheable or not.

At step 108, the user may set up debug tool 4. In particular, the user may use a keyboard or other equipment to inform debug tool 4 of the address space being used by system-on-chip circuitry 32. The user may also inform debug tool 4 of the capabilities of the debug master (e.g., debug parameters to use when communicating, the JTAG ID of debug master 40, etc.) and may inform debug tool 4 of details concerning address translations to be performed on read and write requests that are to be made during testing.

Before testing begins, the user may analyze the nature of the application that is loaded on integrated circuit 10 (e.g., the application to run on cores 68) to determine what type of debug operation to perform. As an example, the user may be interested in examining the contents of memory at a particular memory location during operation of the application. The user may analyze the application's structure and the memory management unit (MMU) setup for memory management unit 66 that is associated with the application to identify a memory address of interest for debugging.

At step 110, the user may setup system-on-chip command translator 76. The user may use a command line on debug tool 4 to perform setup operations. Debug tool 4 may use debug master 40 and interconnects 52 in communicating with translator 76 in response to the user's command line entries. During setup operations at step 110, parameters such as AxUSER and AxCACHE parameters may be used by the user to instruct command translator 76 how to communicate with memory coherency control unit 70 over bus 82. During operation, memory coherency control unit 70 uses parameters such as the AxUSER and AxCACHE parameters to determine cache behavior. Details on cache behavior of memory (i.e., whether or not RAM address range 0x8000_0000-0x8000_FFFF is cacheable or not in the FIG. 3 example) are thus reflected in the AxUSER and AxCACHE parameters.

During these set-up operations, the user programs AxUSER and AxCACHE parameters in memory coherency control unit 70 to match the setup of memory management unit 66. In this example, the debug process will involve monitoring data on the RAM address range 0x8000_0000-0x8000_FFFF. The setup operations of step 110 also involve setting up command translation operations (e.g., address translation) to be performed by command translator 76. In operation, translator 76 translates command translator slave interface addresses received by the command translator slave interface 78 to corresponding command translator master interface addresses on the command translator master interface 74. As an example, step 110 may involve setting up command translator 76 to translate command translator slave interface address 0x0000_0000 to command translator master interface address 0x8000_0000.

At step 112, the user instructs debug tool 4 of the debug operations to be performed and these instructions are gathered from the user by debug tool 4. In the example of FIG. 3 (coherent debug), the user uses the command line of the debug tool to instruct the debug tool to read from address 0x8000_0000. Debug tool 4 has already been informed of appropriate address translation operations to perform on read requests supplied by the user. Accordingly, debug tool 4 translates the requested read address (0x8000_0000) to 0x0000_0000 (as an example).

At step 114, debug master 40 issues a memory access request (i.e., debug master 40 issues a memory read request to 0x0000_0000 in this example).

At step 116, command translator 76 receives the memory access request from the debug master. In this example, command translator slave interface 78 receives the read request (i.e., command translator slave interface 78 of command translator 76 receives the read request for 0x0000_0000).

At step 118, command translator 76 may perform translation operations in accordance with the command translator setup parameters established during the setup operations of step 110. In particular, command translator 76 translates the command translator slave interface addresses received from the debug tool to corresponding command translator master interface addresses (i.e., addresses in RAM address range 0x8000_0000-0x8000_FFFF in this example). Command translator 76 has already been informed (at step 110) of the appropriate address translation to perform on read requests from the debug master. Command translator slave interface 78 may have, as an example, 1 GB of address space and the address translation performed by the command translator may allow this 1 GB of address space to be mapped to one of four 1 GB address spaces in microprocessor unit subsystem 64.

At step 120, memory coherency control unit 70 may receive the translated commands from translator 76 (i.e., slave interface 72 may receive the translated commands via master interface 74 over bus 82). In this example, the command translator master interface address 0x8000_0000 that is associated with the read request is received.

At step 122, memory coherency control unit 70 may process the memory access request. In particular, memory coherency control unit 70 may initiate a coherent read to obtain the requested data at RAM address range 0x8000_0000. Memory coherency control unit 70 is aware of the state of the data in RAM/cache. Memory coherency control unit 70 therefore can obtain a valid version of the data being read from an appropriate location (i.e., L2 cache or L1 cache or RAM 42/44). The debug master need not be aware of data storage details, because these operations are managed by memory coherency control unit 70. The read is said to be "coherent" because memory coherency control unit knows where to obtain a valid version of the data.

At step 124, the performance of the system may be analyzed. The data that has been read in response to the read request is provided from the memory coherency control unit to the command translator and from the command translator to the debug master. The debug tool receives the data from the debug master for analysis and presentation of debug results to the user. The operation of microprocessor unit subsystem 64 is not disrupted during the debug process. Microprocessor unit subsystem 64 and cores 68 are not halted during debugging even though data is being read from cache.

Figure 4:
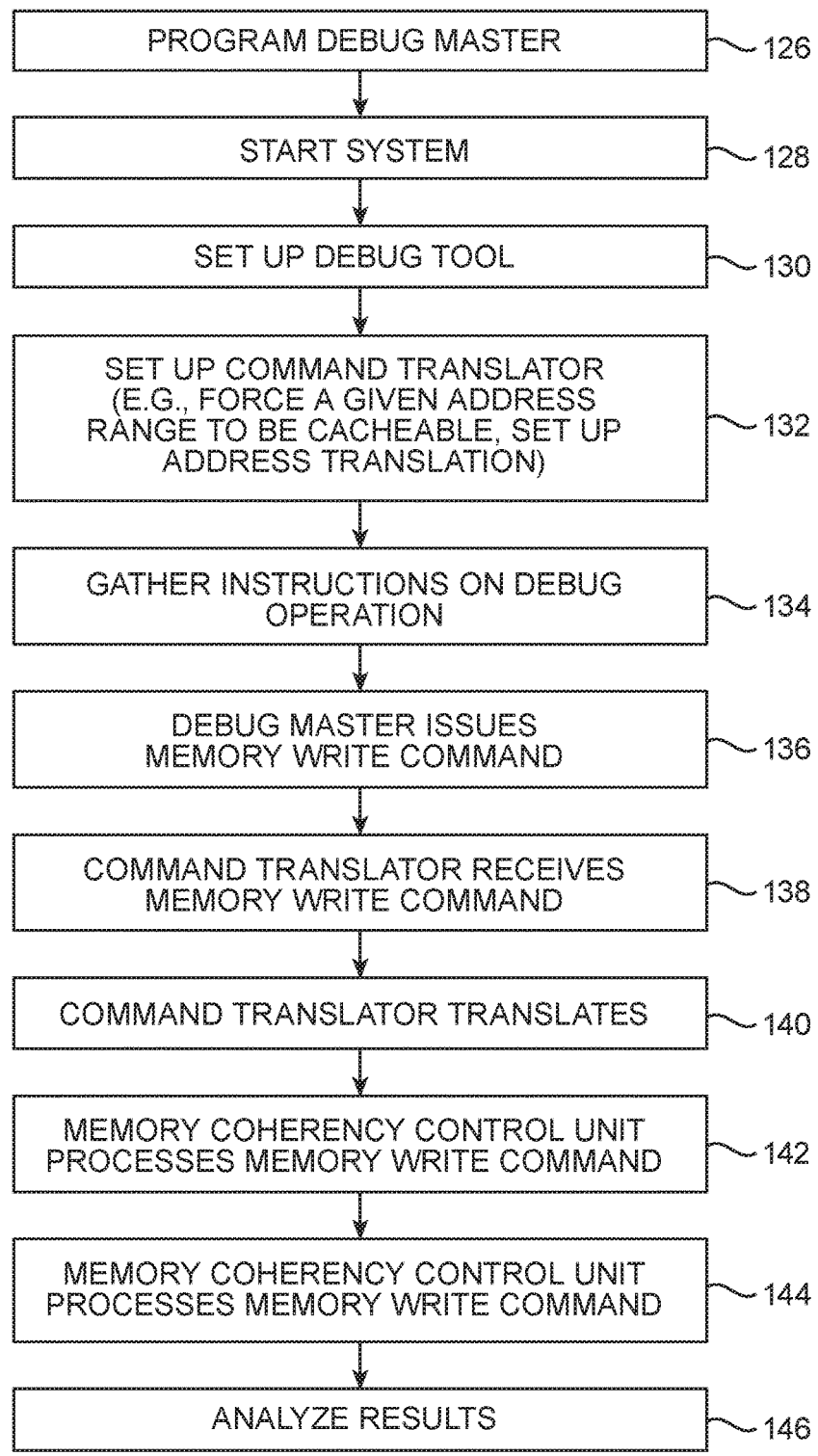
FIG. 4 is a flow chart of illustrative steps involved in using the system of FIG. 1 to perform debugging by performing backdoor access to cache without halting the processing circuitry or modifying application code in accordance with an embodiment of the present invention.

Another illustrative scenario for debugging system 8 is shown in FIG. 4. The example of FIG. 4 involves backdoor access to L2 cache without halting processor cores 68 or modifying application code (i.e., backdoor access to cache debugging operations are performed). In this example, data at memory location range 0x8000_0000-0x8000_00FF is cached in L2 cache. Cores 68 are either executing from this location or working on this data (reads, writes, modifications).

At step 126, programming equipment 6 (e.g., an external configuration integrated circuit and/or a computer-based programming tool) may be used in loading configuration data into programmable circuitry 30. The configuration data that is loaded into programmable circuitry 30 (i.e., into memory elements 20) preferably includes configuration data that configures programmable circuitry 30 to implement debug master 40 for performing desired debug operations. By forming a custom debug master in this way, debug operations can be performed more efficiently than using a hardwired debug master (e.g., by avoiding repetitions reloading operations as described in connection with debug master 48).

At step 128, the user (i.e., test personnel operating debug tool 4) may start system 8. When started, cores 68 begin to run and execute an application (i.e., code). The application that is run sets up memory management unit 66. In this example, memory management unit setup defines that memory address range 0x8000_0000-0x8000_00FF is cacheable in L2 cache.

At step 130, the user may set up debug tool 4. In particular, the user may use a keyboard or other equipment to inform debug tool 4 of the address space being used by system-on-chip circuitry 32. The user also preferably informs debug tool 4 of the capabilities of the debug master (e.g., debug parameters to use when communicating, the JTAG ID of debug master 40, etc.) and informs debug tool 4 of address translation to perform on read and write requests supplied by user.

Before testing begins, the user may analyze the nature of the application that is loaded on integrated circuit 10 (e.g., the application to run on cores 68) to determine what type of debug operation to perform. For example, the user may be interested in examining how the application performs when its behavior is altered by writing data into a particular cache location.

At step 132, the user may set up system-on-chip command translator 76 using a command line or other interface associated with debug tool 4. The user may use AxUSER and AxCACHE parameters to instructs command translator 76 how to communicate with memory coherency control unit 70 over bus 82. Memory coherency control unit 70 uses the AxUSER and AxCACHE parameters to determine cache behavior. In the FIG. 4 example, the debug process involves overwriting the data in L2 cache corresponding to address range 0x8000_0000-0x8000_00FF to force an unexpected behavior onto memory coherency control unit 70. The user programs the AxUSER and AxCACHE parameters into memory coherency control unit 70 to force the address range 0x8000_0000-0x8000_00FF to be cacheable in L2 cache and write back with respect to L2 cache.

Examples of unexpected behaviors that the user is able to force onto the memory coherency control unit through use of the AxUser and AxCACHE parameters and through overwriting of data into the L2 cache include forcing the invalidation of cache lines, forcing a write allocation of non-cacheable region as defined in a processor page table, and forcing a write to a specific cache region. The operations of step 132 involve setting up the address translation to be performed by command translator 76. In operation, command translator 76 translates command translator slave interface addresses received by the command translator slave interface 78 to corresponding command translator master interface addresses on command translator master interface 74. In this example, the user sets up command translator 76 to translate slave interface address 0x0000_0000 to master interface address 0x8000_0000.

At step 134, the user instructs debug tool 4 of the debug operations to be performed and these instructions are gathered from the user by debug tool 4. In this example (backdoor access to L2 cache) the user instructs the debug tool from the debug tool command line to write data to address 0x8000_0000. The debug tool has been informed of appropriate address translation operations to perform on write commands supplied by the user. Accordingly, debug tool 4 translates the write command for address 0x8000_0000 to address 0x0000_0000 (in this example).

At step 136, debug master 40 issues a corresponding memory write command. In this example, debug master 40 issues a write to 0x0000_0000.

At step 138, master interface 80 receives the command and provides the command to slave interface 78 of translator 76. Slave interface 78 receives the command. In this example, slave interface 78 and translator 76 receive the write command for 0x0000_0000.

At step 140, command translator 76 may perform translation operations in accordance with the command translator setup parameters established during the set up operations of step 90. In particular, translator 76 translates the slave interface address for slave 78 from the debug tool to a corresponding master interface address for master 74. Translator 76 has been informed of the appropriate address translation to perform on write commands from the debug master. Translator 76 therefore translates command translator slave interface address 0x0000_0000 to command translator master interface address 0x8000_0000. A described in connection with the example of FIG. 3, slave interface 78 may have 1 GB of address space. The address translation performed by translator 76 may allow this 1 GB of address space to be mapped to one of four 1 GB address spaces in subsystem 64.

At step 142, memory coherency control unit 70 may receive the translated commands from translator 76 (i.e., slave interface 72 may receive the translated write command via master interface 74 over bus 82). In the FIG. 4 example, slave interface 78 of translator 76 receives the command translator master interface address 0x8000_0000 that is associated with the write command.

At step 144, memory coherency control unit 70 processes the memory write command. In this example, the memory coherency control unit initiates a write to store data in the L2 cache location corresponding to the specified memory address 0x8000_0000. After writing data to L2 cache, forced behavior associated with written data may be observed by observing changes in application execution and/or using debug tool 4 to observe system 8. The operation of subsystem 64 can be altered in this way for debugging purposes without halting cores 68 and without the application running on subsystem 64 being aware of this intrusion by debug tool 4. Application code (software) running on circuit 10 (e.g., cores 68) is not changed.

The foregoing is merely illustrative of the principles of this invention and various modifications can be made by those skilled in the art without departing from the scope and spirit of the invention.

What is claimed is:

1. An integrated circuit operable to interface with an external debug tool with which a user supplies debug commands, comprising:
    programmable circuitry;
    a debug master implemented from part of the programmable circuitry, wherein the debug master is coupled to the debug tool to receive commands from the debug tool;
    system-on-chip interconnects coupled to the debug master;
    a microprocessor subsystem having processing circuitry, cache, and a memory coherency control unit, wherein the microprocessor subsystem is coupled to the system-on-chip interconnects with a bus;
    a command translator interposed in the bus, wherein the command translator translates commands received from the debug master and provides corresponding translated commands to the memory coherency control unit over the bus; and
    system-on-chip circuitry in which the system-on-chip interconnects, the microprocessor subsystem, and the command translator are formed.

2. The integrated circuit defined in claim 1 wherein the programmable circuitry comprises:
    programmable interconnects; and
    an array of programmable logic regions that are coupled by the programmable interconnects and that contain memory elements loaded with configuration data.

3. The integrated circuit defined in claim 2 further comprising a Joint Test Action Group path coupled between the debug master and the debug tool, wherein the debug master is configured to receive instructions from the debug tool that direct the debug master to issue memory access commands.

4. The integrated circuit defined in claim 3 wherein the command translator comprises:
    a command translator slave interface coupled to the system-on-chip interconnects to receive the memory access commands from the debug master; and
    a command translator master interface coupled to the memory coherency control unit, wherein the command translator is configured to translate the memory access commands and is configured to provide the translated memory access commands to the memory coherency control unit with the command translator master interface.

5. The integrated circuit defined in claim 4 wherein the memory elements are configured to receive the configuration data from external programming equipment.

6. The integrated circuit defined in claim 4 wherein the system-on-chip circuitry comprises peripherals coupled to the system-on-chip interconnects.

7. The integrated circuit defined in claim 6 wherein the peripherals include a peripheral selected from the group consisting of: UART circuitry, a graphics processing unit, a video accelerator, a modem, a display controller, and a hard drive controller.

8. A method of debugging an integrated circuit having programmable circuitry and system-on-chip circuitry, comprising:
    programming the programmable circuitry to implement a debug master in the programmable circuitry;
    issuing a command with the debug master;
    providing the command from the debug master to a command translator over system-on-chip interconnects in the system-on-chip circuitry;
    with the command translator, translating the command;
    with a memory coherency control unit in a microprocessor unit subsystem in the system-on-chip circuitry, processing the translated command from the command translator; and
    setting up the command translator to translate at least a first memory address to at least a second memory address before providing the command to the command translator over the system-on-chip interconnects.

9. The method defined in claim 8 wherein the command translator includes a slave bus interface coupled to the system-on-chip interconnects and a master bus interface that communicates with a slave in the memory coherency control unit and wherein setting up the command translator comprises providing the command translator with parameters that set up translation operations to be performed between the slave bus interface of the command translator and the master bus interface of the command translator.

10. The method defined in claim 9 wherein translating the command comprises translating a memory address in a memory access command.

11. The method defined in claim 8 wherein translating the command comprises translating a memory read request.

12. The method defined in claim 11 wherein the microprocessor unit subsystem includes microprocessor cores, the method further comprising:
 in response to the memory read request, initiating a coherent read to obtain requested data with the memory coherency control unit; and
 providing the data from the memory coherency control unit to the debug master without halting the microprocessor cores.

13. The method defined in claim 8 wherein translating the command comprises translating a memory write command.

14. The method defined in claim 13 wherein the microprocessor unit subsystem includes microprocessor cores, the method further comprising:
 in response to the memory write command, initiating a write of data with the memory coherency control unit without halting the microprocessor cores.

15. A method of debugging an integrated circuit that contains programmable circuitry and a microprocessor unit subsystem, comprising:
 programming the programmable circuitry to form a debug master;
 with an external debug tool, receiving instructions on debug operations to be performed from a user;
 in response to the instructions, directing the debug master to issue a command on interconnects in the integrated circuit;
 with a command translator, translating the command issued by the debug master, wherein translating the command comprises translating a memory write request to perform backdoor access to cache operations; and
 with a memory coherency control unit in the microprocessor unit subsystem, receiving the translated command.

16. The method defined in claim 15 wherein the integrated circuit comprises a system-on-chip field-programmable gate array integrated circuit and wherein translating the command comprises translating a memory read request to perform coherent debug operations.

17. The method defined in claim 15 wherein the integrated circuit comprises a system-on-chip field programmable gate array integrated circuit.

* * * * *